United States Patent Office 2,958,606
Patented Nov. 1, 1960

2,958,606

PREPARATION OF PROTEIN SOLUTIONS

Edward Green, Bedford, Robert Whittingham Graham, Higham Ferrers, and Howard Stuart Gardner and Alan William Holmes, Rushden, England, assignors to Lever Brothers Company, New York, N.Y., a corporation of Maine No Drawing. Filed May 27, 1953, Ser. No. 357,916

Claims priority, application Great Britain June 6, 1952

11 Claims. (Cl. 106—154)

The present invention relates to the preparation of viscous solutions or viscous colloidal solutions from globular proteins.

Such protein solutions have been prepared by dissolving a globular protein, in particular an oilseed protein such as groundnut protein, in an aqueous alkaline medium and then ageing the solution at a highly alkaline pH for an extended period, which may extend to a day or more. In general, the viscosity of a protein solution so obtained depends on the concentration of protein in the solution, the pH of the solution and the time of ageing. It has been difficult, however, to obtain solutions by this method which remained in the required range of viscosity for a sufficiently long time to enable technical use to be made of them, as the permissible limits of the alkali/protein ratio in the preparation of the ageing solution are undesirably narrow if a satisfactory result is to be obtained.

For many purposes, moreover, an extended period of ageing, and in particular of ageing at such high alkalinity, is undesirable. At a less alkaline pH, even longer periods of ageing may be necessary to attain the required viscosity and it may not be attained at all except at elevated ranges of protein concentration.

It has now been found that the period of ageing to attain a desired viscosity can be considerably reduced and/or an increased viscosity can be obtained by adding to the ageing alkaline protein solution a substance capable of reducing the pH of the solution. The term "ageing" is hereinafter used to denote the period during which the solution is kept at a pH above about 10.5 before the substance is added according to the invention.

The present invention provides, therefore, a process of preparing a viscous protein solution which comprises the step of adding to an ageing alkaline solution of the protein a substance capable of reducing the pH of the solution.

Viscous protein solutions are required for many purposes, such as paper coating, paint and adhesives manufacture. The invention is of particular advantage in connection with the preparation of protein filaments. Such filaments are made by the extrusion of a viscous protein solution through fine orifices into a coagulating bath. The filaments may then be further treated to yield textile fibres. It has also been proposed to use the filaments in the preparation of food products. In general, a viscous protein solution to be extruded (hereinafter termed "spinning solution"), prepared from globular proteins, should contain the protein in a state to allow the formation in the coagulating bath of satisfactory filaments and should preferably have a viscosity in the range of approximately 25 to 300 poises. (The viscosity referred to in this specification is apparent viscosity as determined by a "rolling sphere viscometer.")

The advantage of the present invention lies not only in the saving of time in the preparation of protein solutions of a desired viscosity but also in the fact that the time during which the protein is kept is at the highly alkaline pH is reduced. The invention also makes it possible to obtain a solution of a given viscosity at a lower protein concentration and the invention provides a method of obtaining a protein solution of given viscosity in which the alkali/protein ratio in the preparation of the ageing solution is less critical than in the prior art process.

Protein solutions according to the invention are prepared from globular proteins, such as oilseed proteins. Amongst the latter, soya bean and, especially, groundnut protein are particularly important.

The preparation of a solution involves the substantial separation of the protein from the other substances associated with it in the natural product in which it occurs. A commercial "oil-free" groundnut meal might, for instance, be suspended in water and sufficient alkali added to dissolve the protein, whilst leaving undissolved carbohydrates and certain other materials contained in the meal. After separation of the extract, the protein may be precipitated from it, for example by the addition of acid, and may then be collected by filtration or centrifugation.

An alkaline ageing solution may then be prepared from the protein by suspending it in water and adding, whilst agitating, sufficient alkali, for instance sodium hydroxide, to obtain a solution of the required pH. Alternatively, the alkali may be added in two or more stages, usually two. This latter method leads to better manufacturing control and reproducibility of results and is preferred. In the case of groundnut protein, for instance, the protein and water are usually thoroughly mixed to give a slurry. Sufficient alkali to give a solution of a pH normally between 10 and 10.5 is then usually added and the mixture thoroughly mixed, generally for about 5 minutes. There is no appreciable increase in viscosity whilst the solution is at this intermediate stage. It is usual to check the solids content of the solution by refractive index measurement before the second addition of alkali. As the percentage content of impurities, added with the protein, and the amount of alkali, added to the slurry, are known, the measurement allows the actual protein content of the solution to be calculated. In practice, a given protein concentration is usually aimed at and any final adjustments, for instance the addition of water to the solution, can be conveniently carried out at this stage. As will be explained later, the adjustment to a given alkali/protein ratio in the preparation of the ageing solution is frequently preferred to an adjustment to a given pH. The protein content of the pH 10–10.5 solution having been calculated, and adjusted if necessary, and the amount of alkali already added being known, the amount of alkali required in the second addition to obtain the desired ratio can easily be calculated. After the second addition, the solution is again thoroughly mixed, usually for at least a minute. A sample of the ageing solution is then normally taken and its viscosity is determined from time to time so as to indicate when the substance capable of reducing the pH of the ageing solution should be added to it.

It is preferred to carry out the process of the invention under reduced pressure. Normally, the pressure is reduced before the first addition of alkali and a reduced pressure is maintained until after the substance according to the invention has been added and thoroughly mixed in. A solution of better colour is obtained when working under reduced pressure and this embodiment has the further advantage, in connection with the preparation of a spinning solution, that the solution does not have to be de-aerated before it is extruded into the coagulating bath. Reduced pressure giving a gauge reading of about 26 inches mercury has been found convenient.

An extended study of the viscosity behaviour, during ageing, of ageing solutions of protein has shown that the behaviour varies with the pH, the concentration, the particular protein and the temperature of ageing. The viscosity of many different solutions has been plotted against time during ageing and it has been found that the curves so obtained show an initial increase in viscosity, which is followed by a decrease in viscosity except at the lower ranges of pH; the decrease may be considerable; it is followed, often after one or more hours, by another increase except at the highest ranges of pH. Eventually, the curve may level out. In the case of groundnut protein, for example, no second increase is observed at a pH in the neighbourhood of 12.6 or over. With this protein, the initial pH of ageing in the process of the invention is normally adjusted to a value between about 11.5 and about 13, preferably no higher than about 12.5, when working at temperatures not exceeding about 25° C. The details of the viscosity/time curve obtained with any particular solution will, of course, vary with the various factors mentioned. The maximum value attained during the initial rise and fall in viscosity is hereinafter called "peak viscosity."

The above mentioned factors which control the behaviour during ageing of alkaline solutions of protein determine the magnitude of the peak viscosity, the time taken to attain it and the behaviour of the solution after it has passed peak viscosity, including the viscosity attained on prolonged ageing.

EFFECT OF pH DURING AGEING

It has been noted, when working with a given batch of protein, that comparisons are more readily made by expressing the results in terms of the ratio of amount of alkali, for instance sodium hydroxide, to amount of protein present in the solution. Furthermore, beyond a certain pH value, usually above 13.1, further increases in the alkali/protein ratio do not result in appreciable increases in pH of the protein solution. For comparisons of different batches of protein, on the other hand, it has been found preferable to express the results in terms of pH as the alkali/protein ratio needed to give a certain pH with different batches, even of the same protein, may vary to some extent. Both values are given wherever it has been practicable.

It has been found that an increase in pH up to about 12.5 at a given concentration of protein in the solution and under otherwise comparable conditions, results in a higher peak viscosity. An increase in the pH also shortens the time taken to reach peak viscosity.

In general, with solutions of groundnut protein of a concentration ranging from about 17 to about 22% it has been found that the peak viscosity at a temperature of 25° C. is attained usually In under 10 minutes at pH 12.5
In between 10 and 25 minutes at pH 12.0 whilst no peak viscosity is obtained in one hour at pH 11.5.

EFFECT OF PROTEIN CONCENTRATION

An increase in concentration has been found to have the effect of increasing the magnitude of any peak viscosity which may be attained and has been shown to increase the viscosity obtained on prolonged ageing of, say, 20 hours. On the other hand, the influence of concentration on the time taken to attain peak viscosity is not very great. This is illustrated in the following table showing the results obtained in two series of experiments. Within each series the alkali/protein ratio used in the preparation of the ageing solution of groundnut protein was practically constant.

| Percent protein calculated on amount of protein+water present | Ratio sodium hydroxide/protein | Measured initial pH of ageing solution | Time to attain peak viscosity, mins. | Peak viscosity, 25° C., poises | Viscosity after 20 hrs. ageing, 25° C. poises |
|---|---|---|---|---|---|
| 16.7 | 0.0453 | 12.0 | 16 | 3.6 | 2.6 |
| 18.5 | 0.0453 | 12.1 | 16 | 15 | 13 |
| 20.2 | 0.0453 | 12.1 | 20 | 80 | 93 |
| 22.0 | 0.0454 | 12.1 | 17 | 240 | 800 |
| 22.4 | 0.0454 | 12.0 | 17 | 420 | |
| 16.7 | 0.0545 | 12.4 | 8 | 8.4 | 9 |
| 18.5 | 0.0545 | 12.5 | 8 | 33 | 34 |
| 20.2 | 0.0544 | 12.6 | 10 | 125 | 300 |
| 22.0 | 0.0545 | 12.4 | 8 | 650 | 3,000 |

EFFECT OF NATURE OF PROTEIN

The detailed behaviour during ageing of different globular proteins may vary quite considerably. Tests to find the optimum conditions for a given purpose in carrying out the process of the invention should, therefore, be made before any particular protein is used. Different batches of the same type of protein, for example groundnut protein, may also show variation in detail due to intrinsic differences between the protein of the different batches or differences in the manner in which the protein has been extracted, stored or otherwise treated prior to ageing.

In practice, it might be desirable to standardize manufacturing procedure. Thus, it may be desirable to add the substance capable of reducing the pH of the solution to the ageing solution of a given protein concentration at or near its peak viscosity of a given magnitude. Tests may be made concerning any new batch of protein by preparing a small quantity of an ageing solution having the required protein concentration and an alkali/protein ratio estimated to give the desired result. The viscosity/time curve obtained in the test will show whether a different alkali/protein ratio is required for the desired purpose. One or more successive tests, if required, with estimated ratios based on the results of the previous tests will show what ratio is, in fact, required. Sometimes, it may, however, also be necessary to adjust the protein concentration to attain a peak viscosity of the desired magnitude. Alternatively, the free acid content of every batch of a given kind of protein may be found, for example by titration. A given standard alkali/protein ratio may then be adjusted to take into account the free acid content of any particular batch. In this method of standardization care should, however, be taken to keep the methods of protein extraction, storage and any other preliminary treatment as uniform as possible.

EFFECT OF TEMPERATURE

Generally speaking, an increase in temperature results in a reduction in the time taken to reach peak viscosity. However, it should be borne in mind that, quite generally, viscosity readings obtained at raised temperatures are lower than the corresponding readings at a lower temperature. It is preferred to carry out ageing at temperatures not higher than about 25° C., conveniently at room temperature. At higher temperatures of ageing it may be preferable to lower the initial pH of ageing below the usual range, in the case of groundnut protein, for instance, below about 11.5.

The stage of ageing which the solution has reached when the substance capable of reducing the pH of the solution is added is not critical in order to obtain an increase in viscosity. Generally, however, the addition is effected after the ageing solution has reached at least ⅓, preferably ½, the value of peak viscosity and before it has dropped to the corresponding value after having passed peak viscosity. In the case of groundnut protein, it has been found that suitable spinning solutions of a viscosity in the range between about 25 and 300 poises may usually be obtained by the addition of the substance to an ageing solution at or near its peak viscosity of between 10 and 25 poises. It has been found also that the viscosity of the solution to which the substance is to be added may be reduced to the range between 10 and 25 poises, if it has risen above it, by dilution with the required amount of water. For convenience, the water may be added together with the substance. The amount of water required for dilution may be roughly calculated by an approximate logarithmic relationship (logarithm of viscosity is about proportional to protein concentration) which has been found to exist between the peak viscosity and the protein concentration of a solution.

There are indications that filaments of greater strength are produced when the substance is added to the ageing solution when it is in the region of the peak viscosity. It has also been observed that the strength of filaments tends to increase with an increase of the viscosity of an ageing solution of given concentration immediately prior to the addition of the substance according to the invention.

In the preferred embodiment of the process of the invention, when using groundnut protein, the protein solution contains between 17 and 20% protein, is adjusted to an initial pH of ageing between about 12.0 and 12.5 and ageing is allowed to proceed at room temperature.

It is important for manufacturing purposes that the viscosity of a spinning solution should remain reasonably constant over at least enough time to allow the whole of the solution to be extruded. As a rough rule it may be said, that the viscosity of a spinning solution, once spinning has begun, should fluctuate no more during a working day thereafter than between the limits set by half its viscosity as the lower limit and double its viscosity as the higher limit. Naturally, the more stable its viscosity within these limits, the better it is. It has been found that suitable spinning solutions of the required reasonably stable viscosity may be obtained by observing certain critical conditions when adding the substance according to the invention.

The viscosity of the ageing protein solution begins to rise almost immediately upon the addition of the substance according to the invention. Viscosities of several thousand poises may in many cases be obtained, if desired, by the appropriate choice of conditions. The detailed behaviour of the solution after the addition depends on a number of factors which include:

The previous ageing conditions
The stage of ageing of the solution at which the addition takes place
The extent by which the pH of the solution is lowered.

EFFECT OF EXTENT OF LOWERING pH

In general, the more the pH of a particular solution is lowered, the greater is the viscosity obtained. The lowering of the pH below a certain value is to be avoided, however, because of an increasing tendency of the solution to gel. With groundnut protein, for instance, it is preferred not to reduce the pH below about 10. Usually, the pH is not lowered below about 10.5. A number of measurements obtained with different samples of an ageing protein solution is given below. The results also illustrate how the viscosity varies with the length of time for which the solution is kept after the pH reduction.

EFFECT OF EXTENT OF pH REDUCTION AT OR NEAR PEAK VISCOSITY ON SUBSEQUENT VISCOSITY

| Percent Protein concentration calculated on protein+water | Initial pH of ageing | Peak viscosity, 25° C., poises | pH after pH reduction | Viscosity at 25° C., poises ||||
|---|---|---|---|---|---|---|---|
| | | | | ½ hour | 1 hour | 2 hrs. | 20 hrs. |
| | | | | after pH reduction ||||
| 18.8 | 12.0 | 10.3 | 10.9 | 88 | 92 | | 26 |
| 18.8 | 12.0 | 10.3 | 10.8 | 140 | 150 | 130 | 60 |
| 18.8 | 12.0 | 10.3 | 10.4 | 202 | 250 | 275 | 260 |

It has been found that there is a "stable viscosity" pH range for every given protein solution. When the pH of the given solution is reduced to this stable viscosity pH range, the viscosity rises to a certain value, usually within about half an hour of the addition, and the viscosity of the solution then does not fall by more than 50%, or rise by more than 100% of this value for periods up to about 24 hours or longer. Frequently the viscosity remains within much more narrow limits during this period. The stable viscosity pH range of the solution is usually quite narrow, may vary with the particular protein used and depends also on the concentration of the protein in the solution and its previous treatment, including the pH of ageing and, possibly, the stage of ageing at which the pH was reduced according to the invention; generally, the lower the concentration, the greater the reduction in pH which is required. As an example, the stable viscosity pH of groundnut solutions containing 18.4% protein, whose initial pH of ageing was 12.0, 12.3 and 12.5 respectively, and which were aged to peak viscosity, was 10.5, 10.7 and 11.0, ±0.1 in each case, respectively. In each case the difference in pH was about 1.5 In general, it was found also that, under otherwise identical conditions, the higher was the viscosity of the ageing solution immediately before its pH was reduced according to the invention the higher was the stable viscosity attained.

If the pH of the solution is reduced to a value above the stable viscosity pH range, it is found that the viscosity after reaching a maximum after pH reduction, declines gradually as the solution is kept for longer periods. On the other hand, if the pH of the solution is reduced to a value below the stable viscosity pH range, the viscosity goes on increasing with time and ultimately the solution may gel.

Substances capable of reducing the pH of the solution include: organic acids, such as acetic, tartaric, citric and lactic acid; inorganic acids, such as hydrochloric, sulphuric, nitric, phosphoric and boric acid; salts, such as ammonium chloride, sulphate, acetate, oxalate, citrate, sodium dihydrogen phosphate, disodium hydrogen phosphate, sodium hydrogen sulphite, sodium hydrogen phthalate and compounds such as methylamine hydrochloride. An exception to the effectiveness of substances capable of reducing the pH of the solution according to the invention is the reducing agent, sulphurous acid.

It will be clear that any substance which may be added to the protein solution according to the invention should be compatible with the use to which the viscous protein solution or the products made from it are to be put. In particular, the use of toxic substances must be avoided if the products are intended as food stuffs.

The amount of substance to be added to the solution according to the invention will vary with the various factors previously considered. In particular, the amount of the pH reducing substance used should be suitable to reduce the pH of the solution to the value at which the subsequent behaviour of the solution is appropriate to the purpose for which the solution is intended.

The substances may be added in solid form or in solution.

The mode of addition of the substance is not critical, provided that local concentrations of the substance sufficient to cause precipitation of the protein are avoided. Within this limitation, as rapid an addition as possible is preferred.

Protein solutions prepared in accordance with the process of the invention may contain any of the ingredients which might usually be added to a protein solution, provided such ingredients do not have the effect of counteracting the results obtained according to the invention. The viscosity of the final solution may be reduced by the addition of water.

The following examples are given to illustrate the manner in which the present invention may be performed.

Example 1

Groundnut protein was obtained by extraction at a pH of 7.5 of 1 part of solvent-extracted groundnut meal with 9 parts of 0.03% sodium hydroxide solution. The insoluble residue was removed by centrifuging and the protein precipitated from the clarified extract by acidification with acetic acid to near the isoelectric point, that is, pH 4.7. The protein was separated by centrifuging and washed twice with water.

An aqueous slurry having a protein content of about 19% was prepared. Sufficient 30% sodium hydroxide solution was then added, with mixing, to bring the pH of the resultant solution to 12. The solution was aged at 25° C. for 15 minutes when the solution had reached a viscosity of 8 poises (25° C.).

Sufficient 1.92 N acetic acid solution was then added, with mechanical stirring, to reduce the pH of the protein solution to 10.4. The addition of acid took 2 minutes. The resultant protein solution was de-aerated by centrifuging and then allowed to stand. Its viscosity was found to be:

150 poises (25° C.), 40 mins. after the addition of the acid
165 poises (25° C.), 70 mins. after the addition of the acid
150 poises (25° C.), 3 hours after the addition of the acid
150 poises (25° C.), 70 hours after the addition of the acid A portion of the ageing solution to which no acid had been added was found to have a viscosity of 5.6 poises (25° C.) after 55 minutes' ageing.

Example 2

Sufficient 40% potassium hydroxide solution was added, with mixing, to the groundnut protein slurry (prepared as in Example 1) to bring the pH to 12.1. The solution was aged at 25° C. for 30 minutes at which stage a viscosity of 8 poises (25° C.) was reached. A sufficient volume of 1.92 N acetic acid solution was then added, with mechanical stirring, during a period of 5 minutes to reduce the pH to 10.7. After de-aeration by centrifuging, the viscosity at 25° C. of the resultant solution was found to be:

68 poises (25° C.), 60 mins. after the addition of the acid
65 poises (25° C.), 200 mins. after the addition of the acid
48 poises (25° C.), 70 hours after the addition of the acid The viscosity of the solution when aged at pH 12.1, and not acidified, was found to be 6.1 poises (25° C.) after 90 minutes' ageing.

Example 3

11.3 grams of soya protein (6.75% moisture content) was added to 86.4 ml. of water and the mixture was stirred for 2 or 3 minutes to form a suspension. 2.3 ml. of 30% caustic soda solution were added to the suspension with vigorous stirring to give a pH of 11.8. The mix was centrifuged for 5 minutes to remove air and insoluble matter. The supernatant liquor was aged for an additional period of 56 minutes at 25° C. at which time the viscosity reached 7 poises. 1.5 ml. of 1.92 N acetic acid solution was then added, with mechanical stirring during a period of 5 minutes to bring the pH to 10.7. After de-aeration by centrifuging the viscosity at 25° C. of the resultant solution was found to be:

425 poises (25° C.), 100 mins. after the addition of the acid
675 poises (25° C.), 200 mins. after the addition of the acid
550 poises (25° C.), 400 mins. after the addition of the acid
75 poises (25° C.), 22 hrs. after the addition of the acid.

Example 4

Spinning solutions were prepared from groundnut protein isolated as in Example 1. In each case, an aqueous slurry of the protein, containing between 50 and 60% total solids, was prepared. Reduced pressure, giving a gauge reading of 26 inches Hg, was applied to the system and sufficient water and sodium hydroxide solution was added to obtain a solution having a total solids content of about 22% and a pH between 10 and 10.5 after vigorous stirring. A sample of the solution was withdrawn and its total solids content determined by refractive index measurement. The protein content of the solution was then deduced from the value obtained and the knowledge of solids, other than protein, present in the solution.

Sufficient sodium hydroxide solution and water were then added to the solution to produce the required sodium hydroxide/protein ratio and protein concentration. The solution, still under reduced pressure, was agitated for two minutes and its pH was checked in an external circulating system. A sample of the solution was then withdrawn and transferred to a viscometer. The time when to add the pH reducing substance to the solution was determined by the viscosity measurements obtained on the sample. The required amount of substance was added to the solution at the appropriate time and the solution, still under reduced pressure, agitated for five minutes. A sample was then withdrawn for viscosity measurements. The bulk of the solution was pumped through a filter press to a holding tank. For spinning, the solution was pumped through a candle filter and through a spinneret into a coagulating bath containing 3% acetic acid and 12% sodium chloride. Spinning of the solution was started about 30 minutes after the addition of the pH reducing substance which was a 2 N solution of acetic acid. Satisfactory filaments and a satisfactory spin were obtained in each case. Details of each solution and the viscosity measurements obtained on the samples are tabulated below. A different batch of protein was used for each solution so that the results are not comparable.

| Percent protein calculated on water+protein present | Initial pH of ageing | Corresponding alkali/protein ratio | Peak viscosity | | Viscosity immediately before addition of acetic acid, Poises, 25° C. | Aging time, mins. | pH after addition of acid | Viscosity after addition of acid, poises, 25° C. | | | | | | |
|---|---|---|---|---|---|---|---|---|---|---|---|---|---|---|
| | | | poises, 25° C. | after, mins. | | | | ½ hour | 1 hour | 1½ hours | 2 hours | 2½ hours | 3 hours | 24 hours | 142 hours |
| 19.4 | 12.0 | 0.0546 | 18 | 17 | 18 | 16 | 10.8 | 95 | 102 | 106 | 110 | 113 | 115 | 119 | |
| 19.2 | 11.9 | 0.0503 | 19.2 | 23 | 14 | 10 | 10.6 | | 200 | 210 | 215 | 218 | 222 | 275 | |
| 18.1 | 12.0 | 0.0565 | 13 | 9 | 12.5 | 13 | 10.8 | 73 | 75 | 77 | 79 | 81 | 83 | 67 | 64 |

We claim:

1. The process of preparing a globular protein spinning solution which comprises adding an alkali metal compound to an aqueous suspension of globular protein to form an alkaline ageing solution of the protein having an initial pH between about 11.5 and about 13.0, ageing the alkaline solution of the protein for a time up to about 30 minutes at a temperature less than about 25° C. until the protein solution has a viscosity between one third of its initial peak viscosity and the initial peak viscosity, then adding an acidic substance selected from the group consisting of acetic, tartaric, citric, lactic, hydrochloric, sulphuric, nitric, phosphoric and boric acids, ammonium chloride, sulphate, acetate, oxalate and citrate, sodium dihydrogen phosphate, disodium hydrogen phosphate, sodium hydrogen phthalate and methylamine hydrochloride thereto to reduce the pH thereof by at least half a pH unit to a value above about 10.0, deaerating the protein solution, and allowing the solution to stand to attain a viscosity between 25 and 300 poises.

2. A process according to claim 1, in which the pH of the solution is reduced by between 1 and 2 pH units.

3. A process according to claim 1, in which the pH of the solution is not reduced below 10.5.

4. A process according to claim 1, in which the pH of the solution is reduced to a stable viscosity pH range at which, after an initial rise in viscosity, the viscosity of the solution does not fall by more than 50% nor rise by more than 100% for a period of at least about 6 hours.

5. A process according to claim 1, in which the pH of the solution is reduced in the region of its peak viscosity.

6. A process according to claim 1, in which the ageing solution is prepared from an alkaline solution of the protein having a pH below 10.5.

7. A process according to claim 1, in which the ageing solution is prepared from an alkaline solution of the protein having a pH between 10 and 10.5.

8. A process according to claim 1, in which the initial pH of the ageing solution is between 11.5 and 12.5.

9. A process according to claim 1, in which the ageing solution is prepared under reduced pressure and a reduced pressure is maintained during ageing of the solution and while the ageing solution is being reduced in pH.

10. A process according to claim 1, in which the protein, from which the ageing solution is prepared, is groundnut protein.

11. A process according to claim 10, in which the ageing solution contains 17 to 22% protein.

References Cited in the file of this patent

UNITED STATES PATENTS

| | | |
|---|---|---|
| 2,271,620 | Brier et al. | Feb. 3, 1942 |
| 2,377,885 | Huppert | June 12, 1945 |
| 2,380,020 | Brother | July 10, 1945 |
| 2,469,452 | Caldwell | May 10, 1949 |
| 2,484,878 | Eberl | Oct. 18, 1949 |
| 2,525,792 | Gordon et al. | Oct. 17, 1950 |
| 2,531,383 | Arthur | Nov. 28, 1950 |
| 2,662,023 | Arthur et al. | Dec. 8, 1953 |

UNITED STATES PATENT OFFICE
CERTIFICATE OF CORRECTION

Patent No. 2,958,606                                  November 1, 1960

Edward Green et al.

It is hereby certified that error appears in the printed specification of the above numbered patent requiring correction and that the said Letters Patent should read as corrected below.

Column 6, line 42, for "sulphite" read -- sulphate --.

Signed and sealed this 25th day of April 1961.

(SEAL)
Attest:

ERNEST W. SWIDER
Attesting Officer

DAVID L. LADD
Commissioner of Patents